US012786338B2

(12) United States Patent
Hayashi et al.

(10) Patent No.: US 12,786,338 B2
(45) Date of Patent: Nov. 3, 2026

(54) FUNCTION EXECUTING DEVICE, NON-TRANSITORY COMPUTER-READABLE RECORDING MEDIUM STORING COMPUTER-READABLE INSTRUCTIONS FOR FUNCTION EXECUTING DEVICE, AND METHOD FOR CONTROLLING FUNCTION EXECUTING DEVICE

(71) Applicant: BROTHER KOGYO KABUSHIKI KAISHA, Nagoya (JP)

(72) Inventors: Masahiro Hayashi, Nagoya (JP); Toshikazu Hori, Nagoya (JP); Toshiki Motoyama, Konan (JP); Thanh Nguyenvan, Nagoya (JP); Satoru Yanagi, Obu (JP); Akihito Uno, Iwakura (JP); Tomomi Shiraki, Nagoya (JP); Satoshi Matsushita, Nagoya (JP); Hiroya Nojiri, Nagoya (JP); Daisuke Matsumoto, Nagoya (JP); Taiga Mizumori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 256 days.

(21) Appl. No.: 18/630,148

(22) Filed: Apr. 9, 2024

(65) Prior Publication Data

US 2024/0364831 A1 Oct. 31, 2024

(30) Foreign Application Priority Data

Apr. 27, 2023 (JP) ................................ 2023-073354

(51) Int. Cl.
*H04N 1/32* (2006.01)
*G06F 3/12* (2006.01)

(52) U.S. Cl.
CPC ....... *H04N 1/32673* (2013.01); *G06F 3/1222* (2013.01); *G06F 3/1238* (2013.01)

(58) Field of Classification Search
CPC .. H04N 1/32673; G06F 3/1222; G06F 3/1238
USPC ........................................................ 358/1.15
See application file for complete search history.

(56) References Cited

U.S. PATENT DOCUMENTS

2015/0093992 A1* 4/2015 Tanaka ..................... H04B 5/20
455/41.2
2015/0271346 A1* 9/2015 Nakamura ............ G06F 3/1295
358/1.15
2019/0361650 A1* 11/2019 Ren ....................... G06F 3/1204
2022/0236933 A1* 7/2022 Takeda .................. H04L 63/101
(Continued)

FOREIGN PATENT DOCUMENTS

JP 2022-136867 A 9/2022

*Primary Examiner* — Allen H Nguyen
(74) *Attorney, Agent, or Firm* — Kenealy Vaidya LLP

(57) ABSTRACT

A function executing device may be configured to receive a related instruction related to execution of a scan from an external device, and in a case where the related instruction is received from the external device via a first communication path for executing an encrypted communication, send an authentication information request to the external device. In a case where the related instruction is received from the external device via a second communication path for executing an unencrypted communication, the function executing device may be configured not to send the authentication information request to the external device.

8 Claims, 7 Drawing Sheets

(56) References Cited

U.S. PATENT DOCUMENTS

| | | | | |
|---|---|---|---|---|
| 2022/0283757 | A1 | 9/2022 | Inoue | |
| 2023/0244426 | A1* | 8/2023 | Kitahashi | G06F 3/1222<br>358/1.14 |

* cited by examiner

144

| User ID | Password | Scan | Print | Copy | ... |
|---|---|---|---|---|---|
| AAA | XXX | Permitted | Permitted | Permitted | ... |
| BBB | YYY | Permitted | Not Permitted | Not Permitted | ... |
| Public | - | Permitted / Not Permitted | Not Permitted | Not Permitted | ... |
| ... | ... | ... | ... | ... | ... |

FUNCTION EXECUTING DEVICE, NON-TRANSITORY COMPUTER-READABLE RECORDING MEDIUM STORING COMPUTER-READABLE INSTRUCTIONS FOR FUNCTION EXECUTING DEVICE, AND METHOD FOR CONTROLLING FUNCTION EXECUTING DEVICE

REFERENCE TO RELATED APPLICATION

This application claims priority from Japanese Patent Application No. 2023-073354 filed on Apr. 27, 2023. The entire content of the priority application is incorporated herein by reference.

BACKGROUND ART

An image processing device configured to scan a document is known. The image processing device scans a document and generates scan data when the image processing device receives a scan start request from a processing terminal. In a case where the scan data is to be sent from the image processing device to a cloud storage service, execution of scan is not restricted when communication between the processing terminal and the image processing device is encrypted, whereas the execution of scan is restricted when such communication is not encrypted. In a case where the scan data is to be sent from the image processing device to the processing terminal, the execution of scan is not restricted irrespective of whether communication between the processing terminal and the image processing device is encrypted or not.

SUMMARY

The present disclosure provides an art configured to improve security in a function executing device configured to execute a scan process according to an instruction from an external device and send scan data to the external device.

A function executing device configured to execute a scan function is disclosed herein. The function executing device may comprise: a scan engine; and a controller, wherein the controller may be configured to: receive a related instruction related to execution of a scan from an external device; in a case where the related instruction is received from the external device via a first communication path for executing an encrypted communication, send an authentication information request to the external device; in response to the authentication information request being sent to the external device, receive specific authentication information from the external device via the first communication path; and in a case where a user authentication according to the specific authentication information succeeds, execute a first scan process, wherein the first scan process may comprises: causing the scan engine to scan a document; and sending scan data to the external device via the first communication path, and in a case where the user authentication according to the specific authentication information fails, the first scan process is not executed, wherein in a case where the related instruction is received from the external device via a second communication path for executing an unencrypted communication, the controller may be configured not to send the authentication information request to the external device.

According to the above configuration, the function executing device does not send the authentication information request to the external device when the function executing device receives the related instruction via the second communication path for executing an unencrypted communication. Due to this, a situation in which the specific authentication information is obtained by a third party because the specific authentication information is sent via the second communication path for executing the unencrypted communication can be suppressed from occurring. Accordingly, security can be improved in the function executing device configured to executed a scan process according to an instruction from an external device and send scan data to the external device.

A computer-readable instructions for the function executing device for realizing the above function executing device, a non-transitory computer-readable recording medium storing the computer-readable instructions, and a method for controlling the function executing device are also novel and useful.

BRIEF DESCRIPTION OF DRAWINGS

DESCRIPTION (Configuration of Communication System 2; FIG. 1)

As shown in FIG. 1, a communication system 2 comprises plural terminals 10A to 10C and a multi-function peripheral 100. Each of the devices 10A to 10C, and 100 is connected to a Local Area Network (LAN) 4. The devices 10A to 10C, and 100 are configured to communicate with each other via the LAN 4. The LAN 4 may be a wired LAN or a wireless LAN.

(Configuration of Terminal 10A)

Figure 1:
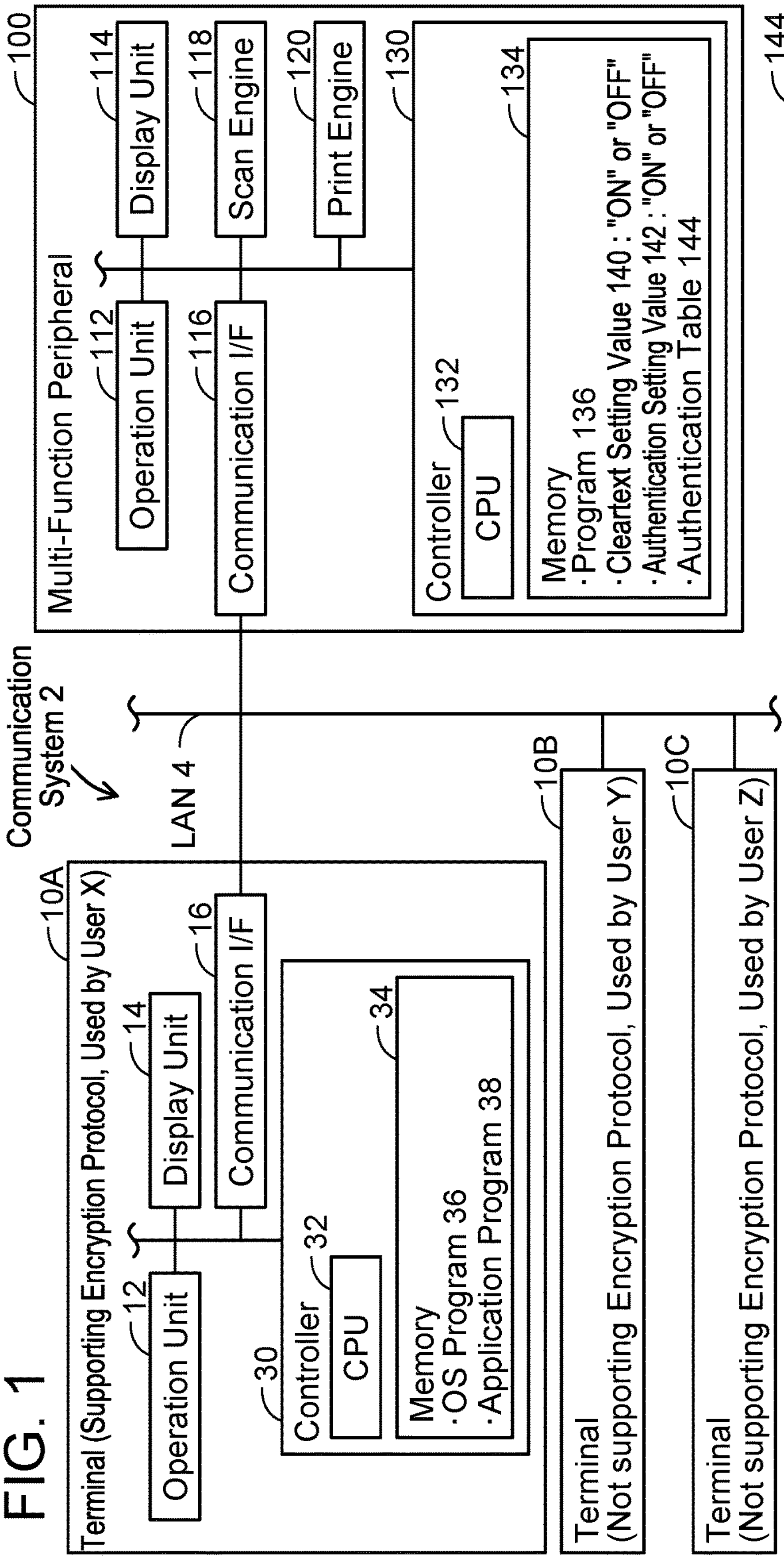
FIG. 1 is a configuration diagram of a communication system.

The terminal 10A is a mobile terminal device such as a cell phone, a smartphone, a PDA, and a tablet PC. In a modification, the terminal 10A may be a stationary PC, a laptop PC. The terminal 10A is a terminal used by a user X of the multi-function peripheral 100. The terminal 10A supports a predetermined encryption protocol. That is, the terminal 10A is configured to communicate encrypted data encrypted by the predetermined encryption protocol with the multi-function peripheral 100. The terminal 10A comprises an operation unit 12, a display unit 14, a communication interface 16, and a controller 30. Each unit 12 to 30 is connected to a bus line. Hereafter, the interface will be referred to as "I/F".

The operation unit 12 is an I/F that allows a user to input various information to the terminal 10A, and comprises a touchscreen and button(s) for example. The user can input the various information to the terminal 10A via the operation unit 12. The display unit 14 is a display configured to display the various information. The communication I/F 16 is connected to the LAN 4.

The controller 30 comprises a CPU 32 and a memory 34. The memory 34 has an OS program 36 and an application program 38 stored therein. The CPU 32 is configured to execute various processes in accordance with the OS program 36 and the application program 38. The memory 34 is for example a ROM, RAM. Hereafter, an OS program will be simply referred to as "OS". Also, an application program will be simply referred to as "app".

The OS 36 controls basic operations of the terminal 10A. The app 38 is a program for causing the multi-function peripheral 100 to execute a scan function, a print function, etc. The app 38 is downloaded from a server on the Internet provided by for example a vendor of the multi-function peripheral 100 and installed on the terminal 10A.

(Configuration of Terminal 10B)

The terminal 10B is a terminal used by a user Y of the multi-function peripheral 100. A configuration of the terminal 10B is the same as the configuration of the terminal 10A except that the terminal 10B does not support the predetermined encryption protocol as above. The terminal 10B cannot communicate encrypted data with the multi-function peripheral 100, but it can communicate unencrypted data (hereafter "cleartext data") with the multi-function peripheral 100.

(Configuration of Terminal 10C)

The terminal 10C is a terminal used by a user Z (a public user) who is not a user of the multi-function peripheral 100. A configuration of the terminal 10C is the same as the configuration of the terminal 10B. That is, the terminal 10C does not support the predetermined encryption protocol as above.

(Configuration of Multi-Function Peripheral 100)

The multi-function peripheral 100 is a peripheral device configured to execute multiple functions such as a scan function, a print function, a copy function, and a facsimile function and is thus a peripheral device for the terminal 10A to 10C for example. The multi-function peripheral 100 supports the predetermined encryption protocol as above.

The multi-function peripheral 100 comprises an operation unit 112, a display unit 114, a communication I/F 116, a scan engine 118, a print engine 120, and a controller 130. Each unit 112 to 130 is connected to a bus line. The operation unit 112 is an I/F that allows a user to input various information to the multi-function peripheral 100, and for example comprises a touchscreen and button(s). The user can input the various information to the multi-function peripheral 100 via the operation unit 112. The display unit 114 is a display configured to display the various information. The scan engine 118 comprises a scan mechanism such as a CCD scheme and a CIS scheme. The print engine 120 comprises a print mechanism such as an inkjet scheme, a laser scheme, and a thermal printing scheme.

The communication I/F 116 is connected to the LAN 4. The communication I/F 116 comprises an encryption port for encrypted data communication and a cleartext port for cleartext data communication. That is, the multi-function peripheral 100 has a communication path for executing an encrypted communication (i.e., communication path directed to the encryption port as its destination) and a communication path for executing an unencrypted communication (i.e., communication path directed to the cleartext port as its destination). While power of the multi-function peripheral 100 is ON, the multi-function peripheral 100 is controlled in a state configured to execute communication via the encryption port. Hereafter, such state will be denoted as "opening the encryption port". The multi-function peripheral 100 is controlled in either an executable state of being able to communicate via the cleartext port and an inexecutable state of being unable to communicate via the cleartext port depending on a cleartext setting value 140 to be described later. Hereafter, the former state will be denoted as "opening the cleartext port", while the latter state will be denoted as "closing the cleartext port". Alternatively in a modification, the encrypted communication and the unencrypted communication may be performed via a same port.

The controller 130 comprises a CPU 132 and a memory 134. The CPU 132 is configured to execute various processes in accordance with a program 136 stored in the memory 134. The memory 134 further stores the cleartext setting value 140, an authentication setting value 142, and an authentication table 144.

The cleartext setting value 140 indicates either "ON" corresponding to opening of the cleartext port and "OFF" corresponding to closing of the cleartext port. The authentication setting value 142 indicates either "ON" corresponding to user authentication for executing a function (e.g., scan function) of the multi-function peripheral 100 being required and "OFF" corresponding to such user authentication being not required.

The authentication table 144 is a table for storing a user ID, a password, and a permission setting value for each function in association with each other. In the present embodiment, for each of the user X of the terminal 10A and the user Y of the terminal 10B, the user ID and the password of the user are registered (i.e., stored) in the authentication table 144. On the other hand, a user ID and a password of the user Z using the terminal 10C are not registered in the authentication table 144. Here, "permission setting value for each function" means a setting value which indicates whether to permit the execution of a function for each of functions that can be executed by the multi-function peripheral 100 (e.g., scan function, print function, copy function) and thus indicates either "Permitted" or "Not Permitted". In particular, a user ID "Public" is a setting value which indicates whether to permit a public user who is not an individual user of the multi-function peripheral 100 (i.e., individual user registered in the authentication table 144) to execute each function. Accordingly, in the authentication table 144, no password is associated with the user ID "Public". That is, a permission setting value for each function that is associated with the user ID "Public" can be regarded as information indicating whether to permit the respective function without execution of user authentication. Each of the setting values 140, 142 and the authentication table 144 can be designated by an administrator of the multi-function peripheral 100.

Figure 2:
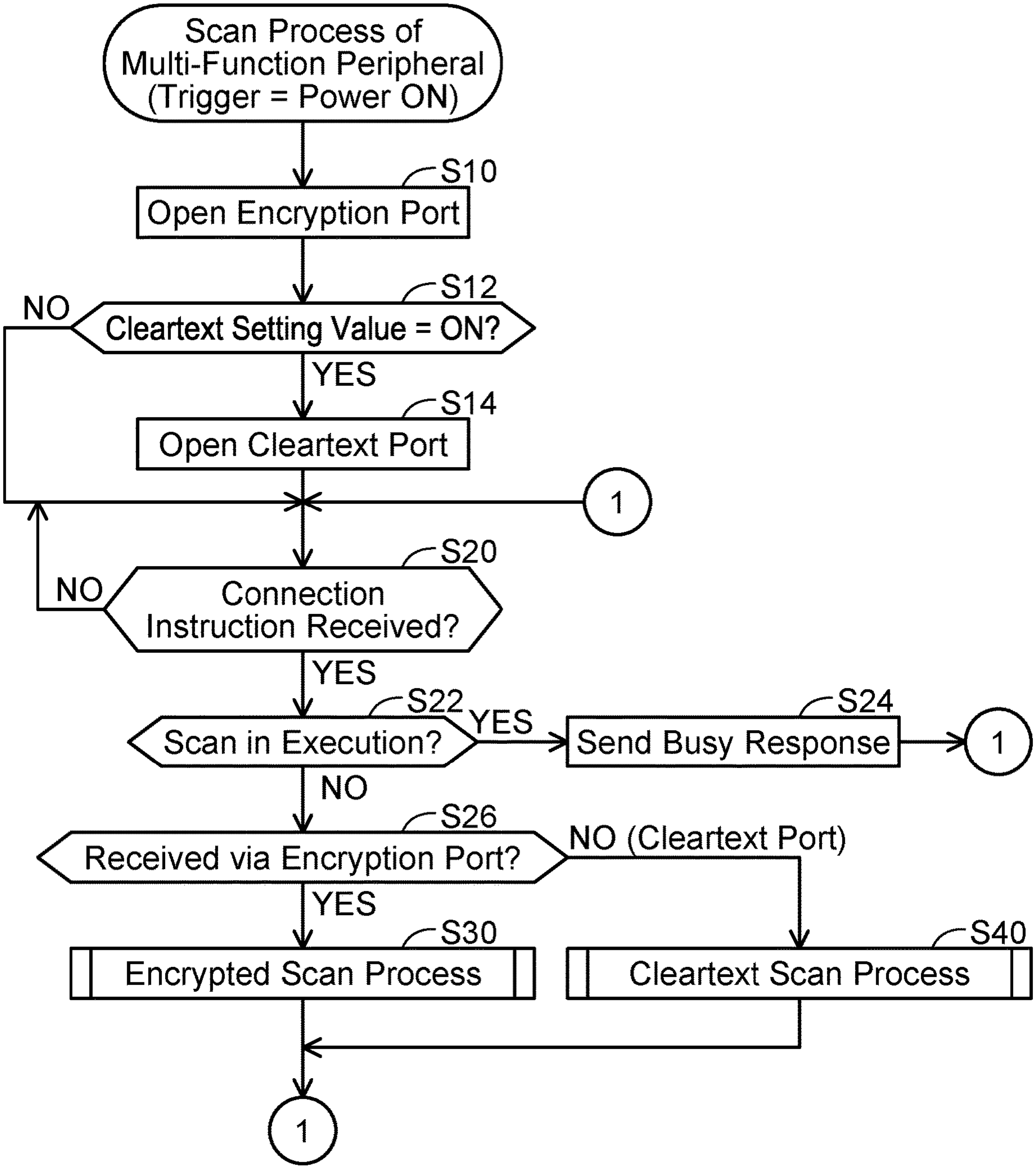
FIG. 2 is a flowchart of processes executed by a multi-function peripheral.

(Scan Process of Multi-Function Peripheral; FIG. 2)

Subsequently, a scan process realized by the CPU 132 of the multi-function peripheral 100 executing the program 136 will be described with reference to FIG. 2. A process of FIG. 2 is started with the power of the multi-function peripheral 100 being turned on as a trigger.

The CPU 132 opens the encryption port in S10. When the multi-function peripheral 100 opens the encryption port, it enters a state of being able to receive a signal via the communication path for executing an encrypted communication according to the predetermined encryption protocol as above. The protocol used by the encryption port is for example Hypertext Transfer Protocol Secure (HTTPS), and its port number is 443.

In S12, the CPU 132 determines whether the cleartext setting value 140 in the memory 134 indicates "ON" or "OFF". The CPU 132 proceeds to S14 when the cleartext setting value 140 indicates "ON" (YES to S12), whereas the CPU 132 skips S14 and proceeds to S20 when the cleartext setting value 140 indicates "OFF" (NO to S12).

In S14, the CPU 132 opens the cleartext port. When the multi-function peripheral 100 opens the cleartext port, it enters a state of being able to receive a signal via the communication path for executing an unencrypted communication. The protocol used by the cleartext port is for example Hypertext Transfer Protocol (HTTP), and its port number is 80.

In S20, the CPU 132 monitors receipt of a connection instruction from a terminal (e.g., the terminal 10A). The connection instruction is a command for instructing the multi-function peripheral 100 to establish a communication session for executing various communications for scanning. The CPU 132 determines YES to S20 and proceeds to S22 when the CPU 32 receives the connection instruction from the terminal. Hereafter, the terminal which sent the connection instruction will be referred to as "target terminal". In the present embodiment, the CPU 132 receives the connection instruction from the target terminal either via the encryption port or via the cleartext port. In particular, the connection instruction via the encryption port includes encrypted information and the connection instruction via the cleartext port includes unencrypted information. The same applies to various communications to be described later.

In S22, the CPU 132 determines whether a scan process is currently in execution. Although details will be described later, when the multi-function peripheral 100 receives the connection instruction from the target terminal and has a communication session established with the target terminal, the multi-function peripheral 100 executes various communications by using the communication session and executes a scan process on a document. Then the multi-function peripheral 100 sends scan data generated by a document scan to the target terminal by using the above communication session. The "scan process" in S22 means a sequence of processes from receiving the connection instruction to sending the scan data. That is, in S22, when the first connection instruction is received earlier than the second connection instruction received in S20 and also the scan data is not sent yet according to the first connection instruction and the subsequent scan executing instruction in S22, the CPU 132 determines that the scan process is currently in execution (YES to S22) and proceeds to S24. Contrary to this, the CPU 132 proceeds to S26 when the CPU 132 determines that the scan process is not currently in execution (NO to S22).

In S24, the CPU 132 sends a busy response indicating that the scan process is in execution to the target terminal. As a result of this, information indicating that the multi-function peripheral 100 is in a busy state is displayed at the target terminal, by which a user of the target terminal can acknowledge that it is impossible to cause the multi-function peripheral 100 to execute a scan due to the multi-function peripheral 100 being in the busy state. When the process of S24 has completed, the CPU 132 returns to the monitoring process of S20 again.

In S26, the CPU 132 determines whether the connection instruction received in S20 was received via the encryption port or the cleartext port. The CPU 132 proceeds to S30 when the connection instruction was received via the encryption port (YES to S26), whereas the CPU 132 proceeds to S40 (NO to S26) when the connection instruction was received via the cleartext port.

In S30, the CPU 132 executes an encrypted scan process. The encrypted scan process is a scan process including encrypted communication. When the process of S30 has completed, the CPU 132 again returns to the monitoring process of S20.

In S40, the CPU 132 executes a cleartext scan process. The cleartext scan process is a scan process which does not include encrypted communication. When the process of S40 has completed, the CPU 132 again returns to the monitoring process of S20.

Figure 3:
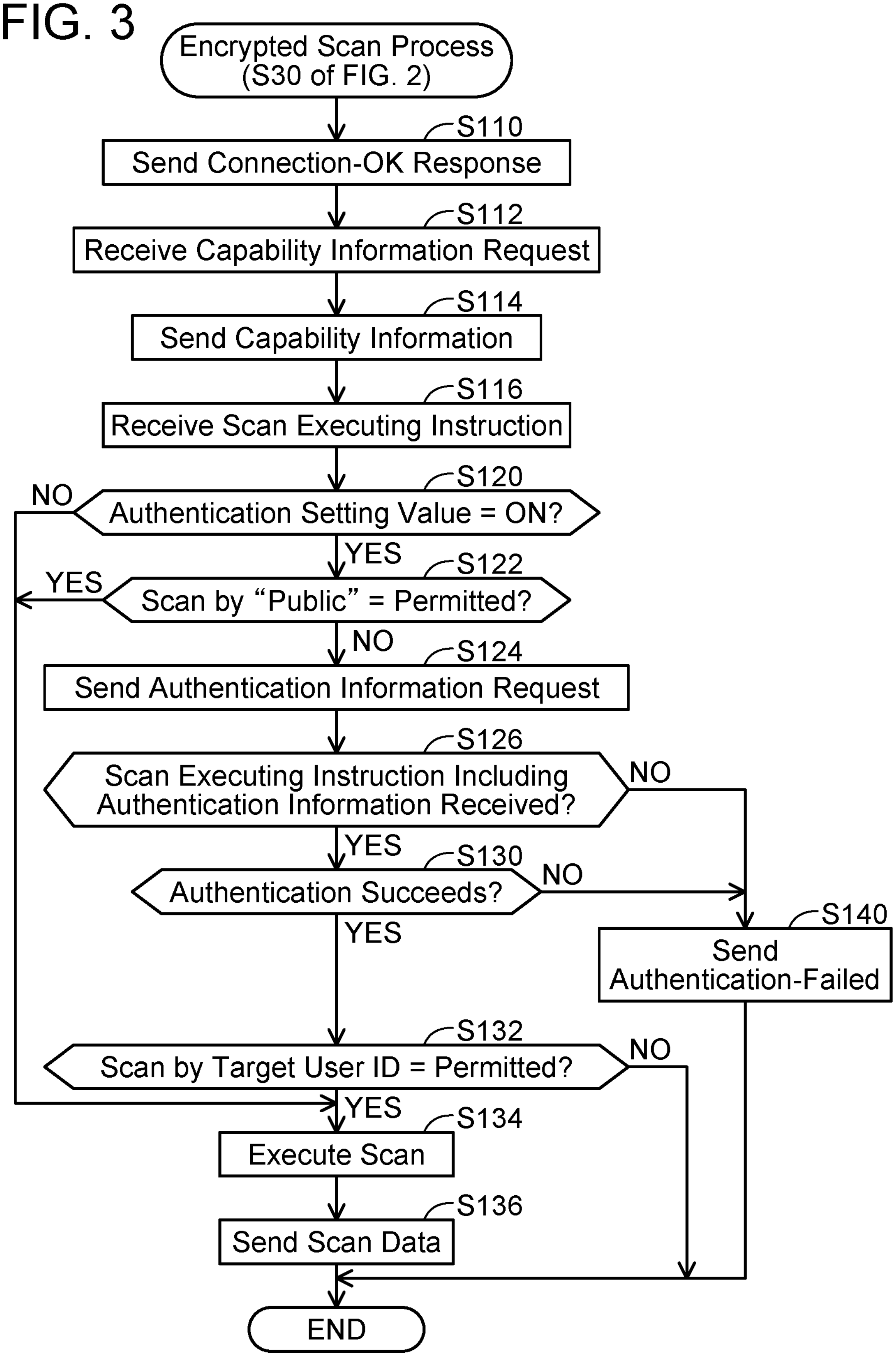
FIG. 3 is a flowchart of an encrypted scan process.

(Encrypted Scan Process; FIG. 3)

Subsequently, with reference to FIG. 3, the encrypted scan process of S30 in FIG. 2 will be described. In S110, the CPU 132 sends a connection-OK response to the target terminal. As a result of this, a communication session is established between the target terminal and the multi-function peripheral 100. The communication session hereof is a communication session for executing an encrypted communication and information included in various communications for which the communication session is used is encrypted. For this reason, security of the communication between the target terminal and the multi-function peripheral 100 is high.

In S112, the CPU 132 receives a capability information request from the target terminal by using the communication session. The capability information request is a signal requesting to send capability information indicating a capability of the multi-function peripheral 100, in particular, a capability regarding the scan function of the multi-function peripheral 100 (e.g., resolution, whether color scan is executable or not, and scannable document size(s)).

In S114, the CPU 132 sends the capability information to the target terminal by using the communication session. As a result of this, as the capability information is displayed at the target terminal, a user of the target terminal can know about the capability of the multi-function peripheral 100, in particular, the capability regarding the scan function of the multi-function peripheral 100. Also, the user can designate scan setting (e.g., resolution, color scan/monochrome scan, and document size).

In S116, the CPU 132 receives a scan executing instruction from the target terminal by using the communication session. The scan executing instruction is a signal requesting the multi-function peripheral 100 to start scanning a document.

In S120, the CPU 132 determines which "ON" or "OFF" the authentication setting value 142 in the memory 134 indicates. The CPU 132 proceeds to S122 when the authentication setting value 142 indicates "ON" (YES to S120), whereas the CPU 132 skips S122 to S132 and proceeds to S134 when the authentication setting value 142 indicates "OFF" (NO to S120). As such, the multi-function peripheral 100 can switch between executing authentication and not executing authentication depending on the value of the authentication setting value 142.

In S122, the CPU 132 determines which "Permitted" or "Not Permitted" a permission setting value of the scan function which is associated with the user ID "Public" of the authentication table 144 in the memory 134. The CPU 132 skips S124 to S132 and proceeds to S134 when the permission setting value indicates "Permitted" (YES to S122), whereas the CPU 132 proceeds to S124 when the permission setting value indicates "Not Permitted" (NO to S122).

In S124, the CPU 132 sends an authentication information request to the target terminal by using the communication session. The authentication information request is a signal requesting to send authentication information (i.e., user ID and password). As a result of this, an inputting screen for inputting the authentication information is displayed at the target terminal. When the authentication information has been inputted by the user of the target terminal, the scan executing instruction including the inputted authentication information, more precisely, the scan executing instruction including the authentication information obtained by the inputted authentication information being encrypted is sent from the target terminal to the multi-function peripheral 100.

In S126, the CPU 132 determines whether the scan executing instruction including the authentication information has been received from the target terminal. Specifically, the CPU 132 decrypts the information included in the scan executing instruction received from the target terminal and determines whether the decrypted information includes the authentication information or not. The CPU 132 determines YES to S126 and proceeds to S130 when the decrypted information includes the authentication information. Contrary to this, the CPU 132 determines NO to S126 and proceeds to S140 when the decrypted information does not include the authentication information.

In S130, the CPU 132 determines whether the authentication information is successfully authenticated. Specifically, the CPU 132 specifies the authentication information included in the decrypted information (i.e., user ID and password). Hereafter, the user ID and the password specified herein will be denoted "target user ID" and "target password", respectively. That is, the target user ID and the target password are the user ID and the password of the user of the target terminal, respectively. Next, the CPU 132 determines whether combination of the target user ID and the target password is stored in the authentication table 144. The CPU 132 determines YES to S130 and proceeds to S132 when the combination of the target user ID and the target password is stored in the authentication table 144. Contrary to this, the CPU 132 determines NO to S130 and proceeds to S140 when the combination of the target user ID and the target password is not stored in the authentication table 144. Since the user authentication is performed as such, scan function can be provided only to a legitimate user.

In S132, the CPU 132 determines which "Permitted" or "Not Permitted" the permission setting value for the scan function which is associated with the target user ID in the authentication table 144 in the memory 134 indicates. The CPU 132 proceeds to S134 when the permission setting value indicates "Permitted" (YES to S132), whereas the CPU 132 skips S134 and S136 and ends the process of FIG. 3 when the permission setting value indicates "Not Permitted" (NO to S134).

In S134, the CPU 132 scans a document, and generates scan data.

In S136, the CPU 132 sends the generated scan data to the target terminal by using the communication session. When the process of S136 has completed, the process of FIG. 3 ends.

In S140, the CPU 132 sends information indicating that the authentication has failed to the target terminal. "The authentication has failed" herein includes that the authentication information has not been received from the target terminal (in the case of NO to S126) and that the authentication information has been received from the target terminal but such authentication information is not stored in the authentication table 144 (NO to S130). When the process of S140 has ended, the process of FIG. 3 ends.

Figure 4:
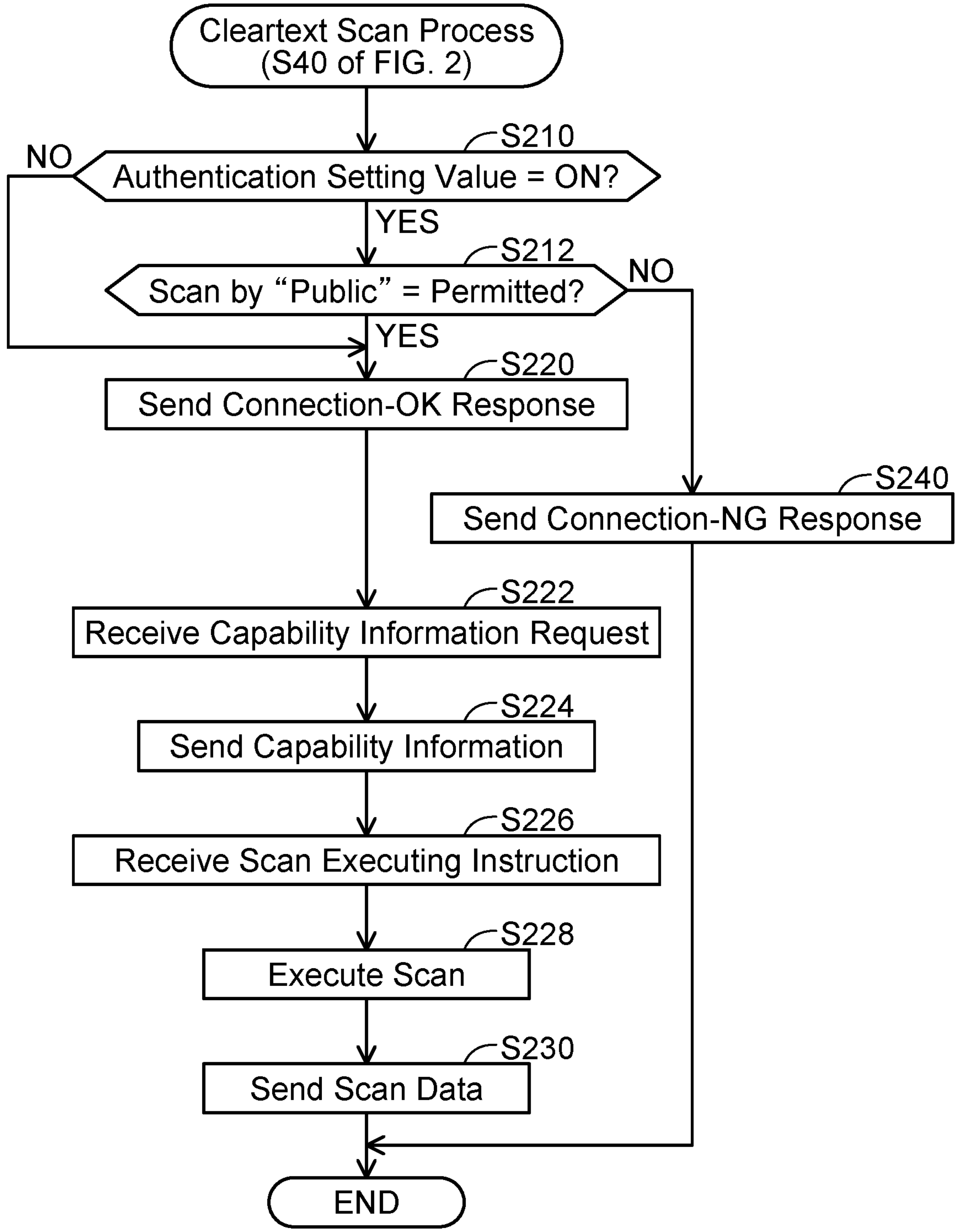
FIG. 4 is a flowchart of a cleartext scan process.

(Cleartext Scan Process; FIG. 4)

Subsequently, with reference to FIG. 4, the cleartext scan process of S40 in FIG. 2 will be described. Processes of S210 and S212 in FIG. 4 are the same as the processes of S120 and S122 in FIG. 3, respectively. The CPU 132 proceeds to S220 when it determines YES to S212, whereas the CPU 132 proceeds to S240 when it determines NO to S212. Processes of S220 to S226 are the same as the processes of S110 to S116 in FIG. 3. However, a communication session established in S220 is a communication session for executing an unencrypted communication, and thus information included in various communications for which the communication session is used is not encrypted. A process of S228 is the same as the process of S134 in FIG. 3. A process of S230 is the same as the process of S136 in FIG. 3 except that the communication session for executing an unencrypted communication is used. As such, even under a situation where the authentication setting value 142 indicates "ON", when the permission setting value associated with the user ID "Public" indicates "ON", the user of the target terminal can cause the multi-function peripheral 100 to execute the scan process. Also, normally under the situation where the authentication setting value 142 indicates "ON", user authentication is required when causing the multi-function peripheral 100 to execute various functions such as scan function, print function and copy function. On the other hand, since the permission setting value for each function can be associated with the user ID "Public", whether the user authentication is required or not required can be set for each function. Due to this, flexible setting that suits administrator's intentions is possible.

In S240, the CPU 132 sends a connection-NG response to the target terminal. Normally, when YES was determined to S210 and NO was determined to S212, user authentication for executing the scan function is required. However, if authentication information for the user authentication is communicated via the cleartext port, such authentication information might be obtained by a third party. To address this, in the present embodiment, the multi-function peripheral 100 sends the connection-NG response to the target terminal in S240 without communicating the authentication information to prevent unauthorized acquisition of the authentication information. In particular, after the multi-function peripheral 100 has received the connection instruction from the target terminal, the multi-function peripheral 100 sends the connection-NG response to the target terminal without communicating the capability information or the scan executing instruction (see S222 to S226). For this reason, unnecessary communication can be suppressed. When the process of S240 has ended, the processes of FIG. 4 ends.

Figure 5:
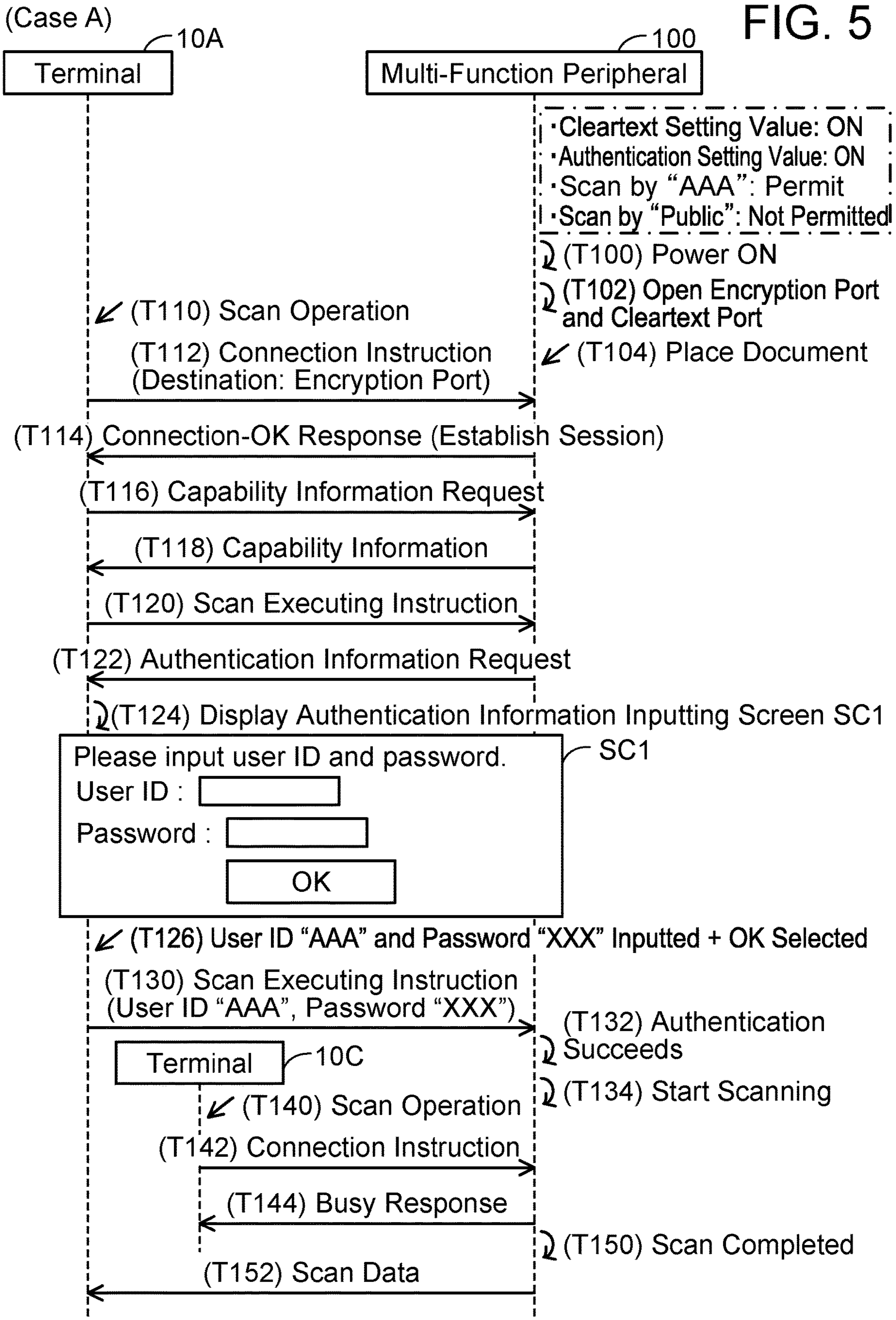
FIG. 5 is a sequence diagram of Case A.

(Case A; FIG. 5)

Subsequently, a specific case realized by the processes of FIGS. 2 to 4 will be described. Firstly, with reference to FIG. 5, Case A in which the user X corresponding to a user ID "AAA" uses the terminal 10A to cause the multi-function peripheral 100 to execute a scan will be described. In an initial state of Case A, both the cleartext setting value 140 and the authentication setting value 142 indicate "ON". Further, the permission setting value for scan function which is associated with the user ID "AAA" in the authentication table 144 indicates "Permitted" and the permission setting value for the scan function associated with the user ID "Public" in the authentication table 144 indicates "Not Permitted".

Hereafter, when a process executed by a CPU (e.g., 32, 132) of a device (e.g., the terminal 10A, the multi-function peripheral 100) is described, for easier understanding, the respective device is described as a subject of action without describing the CPU as the subject of action. Further, communication between the respective devices is executed via a communication I/F (e.g., 16, 116). Accordingly, in the following description, a description "via the communication I/F" will be omitted when any communication is described.

In T100, when the multi-function peripheral 100 receives an operation for turning on power from the user X (trigger for FIG. 2), in T102 the multi-function peripheral 100 opens both the encryption port and the cleartext port (S10, YES to S12, S14). Then, in T104 the user X of the terminal 10A places a document on a document table of the multi-function peripheral 100.

In T110, the user X performs a scan operation on the terminal 10A for causing the multi-function peripheral 100 to execute a scan. In this case, in T112, the terminal 10A sends a connection instruction to the multi-function peripheral 100. Since the terminal 10A supports the predetermined encryption protocol as above, the connection instruction of T110 is sent with the encryption port as its destination.

When the multi-function peripheral 100 has received the connection instruction via the encryption port from the terminal 10A in T112 (YES to S20 in FIG. 2), in T114 the multi-function peripheral 100 sends a connection-OK response to the terminal 10A (NO to S22, YES to S26, S110 in FIG. 3).

In T114, the terminal 10A receives a connection-OK response from the multi-function peripheral 100. As a result of this, a communication session for executing an encrypted communication according to the predetermined encryption protocol as above is established between the terminal 10A and the multi-function peripheral 100. Due to this, the following various communications are executed by using the communication session. In T116, the terminal 10A sends the capability information request to the multi-function peripheral 100.

When the multi-function peripheral 100 receives the capability information request (S112) from the terminal 10A in T116, in T118 the multi-function peripheral 100 sends a capability information as a response to the terminal 10A (S114).

In T118, the terminal 10A receives the capability information as a response from the multi-function peripheral 100. Thereafter, when the terminal 10A receives the user X's designation of the scan setting according to the capability information, in T120 the terminal 10A sends the scan executing instruction according to the designated scan setting to the multi-function peripheral 100.

In T120, the multi-function peripheral 100 receives the scan executing instruction from the terminal 10A (S116). In the present case, the authentication setting value 142 indicates "ON" (YES to S120) and the permission setting value for the scan function associated with the user ID "Public" in the authentication table 144 indicates "Not Permitted" (NO to S122). In this case, in T122 the multi-function peripheral 100 sends the authentication information request to the terminal 10A (S124).

When in T122, the terminal 10A receives the authentication information request from the multi-function peripheral 100, in T124 the terminal 10A displays an authentication information inputting screen SC1. The authentication information inputting screen SC1 includes a user ID inputting field, a password inputting field, and an OK button. In T126 the terminal 10A receives input of the user ID "AAA" to the user ID inputting field and input of the password "XXX" to the password inputting field, and then receives selection of the OK button from the user X. In this case, in T130 the terminal 10A sends the scan executing instruction including information which is obtained by the inputted user ID "AAA" and password "XXX" being encrypted to the multi-function peripheral 100 by using the communication session.

When in T130 the multi-function peripheral 100 receives the scan executing instruction from the terminal 10A, the multi-function peripheral 100 decrypts the information included in the scan executing instruction and obtains the user ID "AAA" and password "XXX" (YES to S126). Because the combination of the obtained user ID "AAA" and password "XXX" is stored in the authentication table 144, in T132 the multi-function peripheral 100 determines that the authentication has succeeded (YES to S130). Also, because the permission setting value corresponding to the scan function and associated with the obtained user ID "AAA" indicates "Permitted" in the authentication table 144 (YES to S132), the multi-function peripheral 100 starts scanning a document in T134.

When in T140 the terminal 10C receives a scan operation for causing the multi-function peripheral 100 to execute a scan from the user Z while the multi-function peripheral 100 is scanning the document, in T142 the terminal 10C sends a connection instruction to the multi-function peripheral 100.

When in T142 the multi-function peripheral 100 receives the connection instruction from the terminal 10C (YES to S20 in FIG. 2), since the scan of the document is in execution (YES to S22), in T144 the multi-function peripheral 100 sends a busy response to the terminal 10C (S24). Due to this, the user Z of the terminal 10C can acknowledge that it is impossible to cause the multi-function peripheral 100 to execute a scan due to the multi-function peripheral 100 being in the busy state.

Thereafter, when in T150 the scan of the document has completed and thus has scan data generated, in T152 the multi-function peripheral 100 sends the scan data to the terminal 10A. As such, the user X of the terminal 10A can obtain the scan data representing the document. As described above, the scan data is sent by using the communication session for executing an encrypted communication (i.e., sent in encrypted form). Due to this, a content of the original document of the scan data can be suppressed from being leaked.

Figure 6:
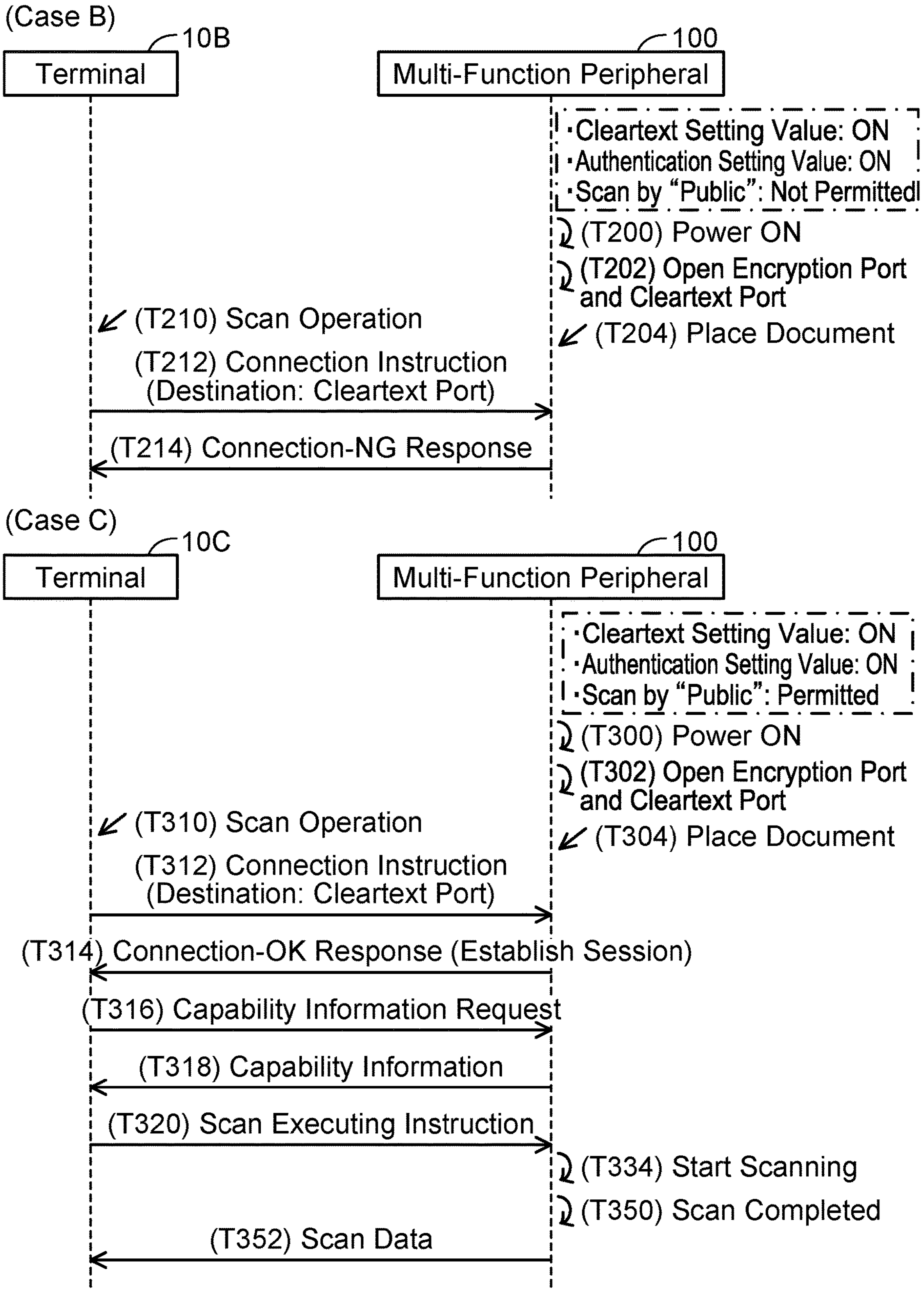
FIG. 6 is sequence diagrams of Case B and Case C.

(Case B; FIG. 6)

Subsequently, with reference to FIG. 6, Case B will be described. Case B is a case where the user Y corresponding to a user ID "BBB" uses the terminal 10B and causes the multi-function peripheral 100 to execute a scan. In an initial state of Case B, both the cleartext setting value 140 and the authentication setting value 142 indicate "ON". Also, the permission setting value for scan function associated with the user ID "Public" in the authentication table 144 indicates "Not Permitted". Processes of T200 to T204 are the same as the processes of T100 to T104 in FIG. 5.

In T210, the user Y performs the scan operation on the terminal 10B for causing the multi-function peripheral 100 to execute a scan. In this case, in T212, the terminal 10B sends a connection instruction to the multi-function peripheral 100. Since the terminal 10B does not support the predetermined encryption protocol as above, the connection instruction of T210 is sent with the cleartext port as its destination.

In T212, the multi-function peripheral 100 receives the connection instruction via the cleartext port from the terminal 10B (YES to S20, NO to S22, NO to S26 in FIG. 2). In Case B, the authentication setting value 142 indicates "ON" (YES to S210 in FIG. 4), and the permission setting value for scan function associated with the user ID "Public" in the authentication table 144 indicates "Not Permitted" (NO to S212). In this case, in T214, the multi-function peripheral 100 sends a connection-NG response to the terminal 10B (S240). Due to this, the authentication information can be suppressed from being illegally obtained by a third party.

(Case C; FIG. 6)

Subsequently, with reference to FIG. 6, Case C will be described. Case C is a case where the user Z who is a public user uses the terminal 10C and causes the multi-function peripheral 100 to execute a scan. In an initial state of Case C, both the cleartext setting value 140 and the authentication setting value 142 indicate "ON". Further, the permission setting value for scan function associated with the user ID "Public" in the authentication table 144 indicates "Permitted". Processes of T300 to T304 are the same as the processes of T100 to T104 in FIG. 5.

In T310, the user Z performs the scan operation on the terminal 10C for causing the multi-function peripheral 100 to execute a scan. In this case, in T312, the terminal 10C sends a connection instruction to the multi-function peripheral 100. Since the terminal 10C does not support the predetermined encryption protocol as above, the connection instruction of T310 is sent with the cleartext port as its destination.

In T312, the multi-function peripheral 100 receives the connection instruction via the cleartext port from the terminal 10C (YES to S20, NO to S22, NO to S26 in FIG. 2). In Case C, the authentication setting value 142 indicates "ON" (YES to S210 in FIG. 4), and the permission setting value for scan function associated with the user ID "Public" in the authentication table 144 indicates "Permitted" (YES to S212). In this case, in T314, the multi-function peripheral 100 sends a connection-OK response to the terminal 10C (S220). As a result of this, a communication session for executing an unencrypted communication is established between the terminal 10C and the multi-function peripheral 100.

Processes of T316 to T320 are the same as the processes of T116 to T120 in FIG. 5 except that the communication session for executing an unencrypted communication is used in each of the processes T316 to T320. Processes of T334 and T350 are the same as the processes of T134 and T150 in FIG. 5. A process of T352 is the same as the process of T152 in FIG. 5 except that the communication session for executing an unencrypted communication is used in T352. That is, in T352, the multi-function peripheral 100 sends unencrypted scan data to the terminal 10C.

Figure 7:
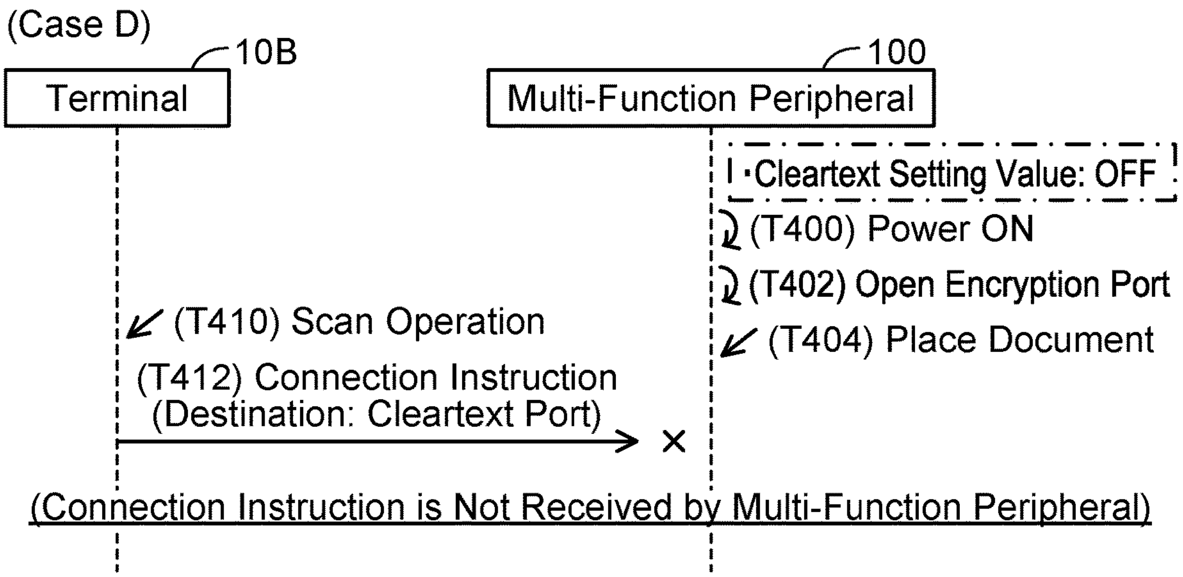
FIG. 7 is a sequence diagram of Case D.

(Case D; FIG. 7)

Subsequently, with reference to FIG. 7, Case D will be described. Case D is a case where the cleartext setting value 140 indicates "OFF". A process of T400 is the same as the process of T100 in FIG. 5. Since in Case D the cleartext setting value 140 indicates "OFF", the multi-function peripheral 100 opens the encryption port in T402 (S10, NO to S12 in FIG. 2). That is, in Case D, the cleartext port is closed. Then in T404 the user Y of the terminal 10B places a document on the document table of the multi-function peripheral 100.

A process of T410 is the same as the process of T210 in FIG. 6. In T412, the terminal 10B sends a connection instruction to the multi-function peripheral 100. Since the terminal 10B does not support the predetermined encryption protocol as above, the connection instruction of T410 is sent with the cleartext port as its destination. However, in Case D, the cleartext port is closed. Accordingly, the connection instruction is not received by the multi-function peripheral 100 (NO to S20 in FIG. 2). An administrator of the multi-function peripheral 100 can cause the multi-function peripheral 100 not to execute an unencrypted communication by designating the cleartext setting value 140 as "OFF" as such. Therefore, security of the multi-function peripheral 100 can be improved.

Effects by Embodiments

According to the above configuration, when the multi-function peripheral 100 receives the connection instruction sent with the cleartext port as its destination from the terminal 10B (T212 in FIG. 6), the multi-function peripheral 100 does not send the authentication information request to the terminal 10B (see FIG. 4). For this reason, the authentication information can be suppressed from being obtained by a third party because the authentication information is sent with the cleartext port as its destination. Thus, in the multi-function peripheral 100 which executes the scan process in accordance with an instruction from a terminal (e.g., terminal 10A to 10C) and thus sends scan data to the terminal, security can be improved.

(Correspondence Relationships)

Each of the terminals 10A to 10C is an example of "external device". The terminal 10C is an example of "another external device". The multi-function peripheral 100 is an example of "function executing device". The communication path for executing an encrypted communication and the communication path for executing an unencrypted communication are examples of "first communication path" and "second communication path", respectively. "ON" and "OFF" of the authentication setting value 142 are examples of "first value" and "second value", respectively. The permission setting value for scan function associated with the user ID "Public" in the authentication table 144 is an example of "permission setting value". The combination of a user ID and a password is an example of "user authentication information". The information obtained by encrypting the user ID "AAA" and the password "XXX" is an example of "specific authentication information". The connection instruction is an example of "related instruction". The processes executed in S134 and S136 in FIG. 3 are an example of "first scan process". The processes executed in S228 and S230 in FIG. 4 are an example of "second scan process". The connection-NG response sent in S240 in FIG. 4 is an example of "error signal".

The process of S20 in FIG. 2 is an example of "receive a related instruction". The process of S112, the process of S116, the process of S124, the process of S126, and the process of S130 in FIG. 3 are respectively examples of "receive a capability information request", "receive a scan executing instruction", "send an authentication information request to the external device", "receive specific authentication information", and "execute the user authentication". The processes of S134 and S136 in FIG. 3 are an example of "execute a first scan process". The processes of S228 and S230 in FIG. 4 are an example of "execute a second scan process". The process of S240 in FIG. 4 is an example of "send an error signal".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) When the scan executing instruction is received in S116 in FIG. 3, the multi-function peripheral 100 may execute scanning of a document and generate scan data. Then, the multi-function peripheral 100 may send the generated scan data to the target terminal when YES to S130 and YES to S132 are determined. Contrary to this, the multi-function peripheral 100 may not send the generated scan data to the target terminal when NO is determined to S130. In the present modification, the scanning of a document being executed but the scan data being not sent to the target terminal is an example of "the first scan process is not executed".

(Modification 2) The multi-function peripheral 100 may not store the authentication table 144, but for example an external authentication server, an external storage may store the authentication table 144. In this case when the scan executing instruction including the authentication information is received in S126 in FIG. 3, the multi-function peripheral 100 may send such authentication information to the authentication server, or to the external storage. In the present modification, "execute the user authentication" may be omitted.

(Modification 3) The multi-function peripheral 100 may not store the authentication setting value 142. In this case, the multi-function peripheral 100 may omit the processes of S120 and S122 and may execute the process of S124 in FIG. 3. Further, the multi-function peripheral 100 may omit the processes of S210 and S212 and may execute the process of S240 in FIG. 4. In the present modification, "execute a second scan process" may be omitted.

(Modification 4) The authentication table 144 may not store the user ID "Public". That is, the multi-function peripheral 100 may not be configured to permit a function (e.g., scan function) for a public user.

(Modification 5) The multi-function peripheral 100 may omit the processes of S22 and S24 in FIG. 2. That is, when the multi-function peripheral 100 receives a new connection instruction while executing the scan process (the scan process is in execution), the multi-function peripheral 100 may execute the processes of S26 and after in FIG. 2 in accordance with the new connection instruction.

(Modification 6) Timing when the processes of S210 and S212 in FIG. 4 are executed is not limited to that in the embodiment. For example, the processes of S210 and S212 may be executed after the process of S222 or may be executed after the process of S226. When NO is determined to S212 under these situations, the multi-function peripheral 100 may send an error signal to the target terminal instead of the connection-NG response in S240. In the present modification, the above error signal is an example of "error signal". In general terms, the timing of "send an error signal" may not be limited to that in the embodiment.

(Modification 7) The multi-function peripheral 100 may omit the processes of S112 and S114 in FIG. 3. In the present modification, "receive a capability information request" may be omitted.

(Modification 8) The multi-function peripheral 100 may not store the cleartext setting value 140. In this case, the multi-function peripheral 100 may omit the process of S12 in FIG. 2.

(Modification 9) The multi-function peripheral 100 may open the cleartext port in a state where the power of the multi-function peripheral 100 is ON. The cleartext setting value 140 indicating "ON" in such a situation may mean being in a state of executing a process in accordance with a signal received via the cleartext port. Also, the cleartext setting value 140 indicating "OFF" may mean being in a state of not executing a process in accordance with a signal even when the signal is received via the cleartext port.

(Modification 10) In the above embodiments, each process of the respective steps in FIGS. 2 to 7 is realized by software (e.g., the OS 36A, 36B, the app 38, the program 136) but at least one of these processes may be realized by hardware such as a logic circuitry.

What is claimed is:

1. A function executing device configured to execute a scan function, the function executing device comprising:

a scan engine;

a memory configured to store an authentication setting value, wherein the authentication setting value indicates either of a first value which corresponds to a user authentication for executing the scan function being required or a second value which corresponds to the user authentication for executing the scan function being not required; and a controller, wherein the controller is configured to:

receive a related instruction related to execution of a scan from an external device;

in a case where the related instruction is received from the external device via a first communication path for executing an encrypted communication in a situation where the authentication setting value in the memory indicates the first value, send an authentication information request to the external device;

in response to the authentication information request being sent to the external device, receive specific authentication information from the external device via the first communication path; and in a case where a user authentication according to the specific authentication information succeeds, execute a first scan process, wherein the first scan process comprises:

causing the scan engine to scan a document; and sending scan data to the external device via the first communication path, and in a case where the user authentication according to the specific authentication information fails, the first scan process is not executed, wherein in a case where the related instruction is received from the external device via a second communication path for executing an unencrypted communication in the situation where the authentication setting value in the memory indicates the first value, the controller is configured not to send the authentication information request to the external device, in the case where the related instruction is received from the external device via the first communication path in a situation where the authentication setting value in the memory indicates the second value, the controller is configured to execute the first scan process, and in the case where the related instruction is received from the external device via the second communication path in the situation where the authentication setting value in the memory indicates the second value, the controller is further configured to execute a second scan process, and wherein the second scan process comprises:

causing the scan engine to scan a document; and sending scan data to the external device via the second communication path.

2. The function executing device as in claim 1, further comprising a memory configured to store a plurality of pieces of user authentication information corresponding to a plurality of individual users, wherein the controller is further configured to, in the case where the specific authentication information is received from the external device via the first communication path, execute the user authentication according to the specific authentication information and the plurality of pieces of user authentication information stored in the memory.

3. The function executing device as in claim 1, wherein the function executing device is configured to execute a plurality of functions including the scan function, in the situation where the authentication setting value indicates the first value, the memory is configured to further store a permission setting value for each of the plurality of functions, the permission setting value indicating whether execution of the function is permitted without executing the user authentication, in the case where the related instruction is received from the external device via the second communication path in a situation where the authentication setting value in the memory indicates the first value and the permission setting value corresponding to the scan function in the memory indicates that execution of the scan function without executing the user authentication is permitted, the controller is configured to execute the second scan process without executing the user authentication, and in the case where the related instruction is received from the external device via the second communication path in a situation where the authentication setting value in the memory indicates the first value and the permission setting value corresponding to the scan function in the memory indicates that execution of the scan function without executing the user authentication is not permitted, the controller is configured not to send the authentication information request to the external device.

4. The function executing device as in claim 1, wherein even if the related instruction is received from a different external device via the first communication path during a period from when the related instruction is received from the external device via the first communication path until when the scan data is sent to the external device via the first communication path, the controller is configured not to send the authentication information request to the different external device.

5. The function executing device as in claim 1, wherein the related instruction is a connection instruction for instructing the function executing device to establish a communication session between the function executing device and the external device, the controller is further configured to receive a scan executing instruction from the external device by using the communication session, wherein in a case where the scan executing instruction is received from the external device via the first communication path, the controller is configured to send the authentication information request to the external device, and in a case where the connection instruction is received from the external device via the second communication path, the controller is further configured to send an error signal to the external device without sending the authentication information request to the external device.

6. The function executing device as in claim 5, wherein the controller is further configured to receive a capability information request from the external device by using the communication session after the communication session has been established and before the scan executing instruction is received, wherein the capability information request is a signal for requesting capability information indicating capability of the function executing device to be sent.

7. A non-transitory computer-readable recording medium storing computer-readable instructions for a function executing device configured to execute a scan function, wherein the function executing device comprises:

a scan engine;

a memory configured to store an authentication setting value, wherein the authentication setting value indicates either of a first value which corresponds to a user authentication for executing the scan function being required or a second value which corresponds to the user authentication for executing the scan function being not required; and a processor, wherein the computer-readable instructions, when executed by the processor, cause the function executing device to:

receive a related instruction related to execution of a scan from an external device;

in a case where the related instruction is received from the external device via a first communication path for executing an encrypted communication in a situation where the authentication setting value in the memory indicates the first value, send an authentication information request to the external device;

in response to the authentication information request being sent to the external device, receive specific authentication information from the external device via the first communication path; and in a case where a user authentication according to the specific authentication information succeeds, execute a first scan process, wherein the first scan process comprises:

causing the scan engine to scan a document; and sending scan data to the external device via the first communication path, and in a case where the user authentication according to the specific authentication information fails, the first scan process is not executed, wherein in a case where the related instruction is received from the external device via a second communication path for executing an unencrypted communication in the situation where the authentication setting value in the memory indicates the first value, the authentication information request is not sent to the external device, and in the case where the related instruction is received from the external device via the first communication path in a situation where the authentication setting value in the memory indicates the second value, the first scan process is executed, wherein the computer-readable instructions, when executed by the processor, further cause the function executing device to:

in the case where the related instruction is received from the external device via the second communication path in the situation where the authentication setting value in the memory indicates the second value, execute a second scan process, and wherein the second scan process comprises:
causing the scan engine to scan a document; and
sending scan data to the external device via the second communication path.

8. A method for controlling a function executing device configured to execute a scan function and comprising a scan engine and a memory configured to store an authentication setting value, wherein the authentication setting value indicates either of a first value which corresponds to a user authentication for executing the scan function being required or a second value which corresponds to the user authentication for executing the scan function being not required, the method comprising:

receiving a related instruction related to execution of a scan from an external device;

in a case where the related instruction is received from the external device via a first communication path for executing an encrypted communication in a situation where the authentication setting value in the memory indicates the first value, sending an authentication information request to the external device;

in response to the authentication information request being sent to the external device, receiving specific authentication information from the external device via the first communication path; and in a case where a user authentication according to the specific authentication information succeeds, executing a first scan process, wherein the first scan process comprises:
causing the scan engine to scan a document; and
sending scan data to the external device via the first communication path, and in a case where the user authentication according to the specific authentication information fails, the first scan process is not executed, wherein in a case where the related instruction is received from the external device via a second communication path for executing an unencrypted communication in the situation where the authentication setting value in the memory indicates the first value, the authentication information request is not sent to the external device, and in the case where the related instruction is received from the external device via the first communication path in a situation where the authentication setting value in the memory indicates the second value, the first scan process is executed, wherein the method further comprising:

in the case where the related instruction is received from the external device via the second communication path in the situation where the authentication setting value in the memory indicates the second value, executing a second scan process, and wherein the second scan process comprises:
causing the scan engine to scan a document; and
sending scan data to the external device via the second communication path.

* * * * *